United States Patent Office 3,565,850
Patented Feb. 23, 1971

3,565,850
PIGMENT DISPERSION FOR ACRYLICS
Claude G. Bradley, Baton Rouge, La., and Nealie T. Anderson, Chester, Va., assignors to Monsanto Company, St. Louis, Mo., a corporation of Delaware
No Drawing. Continuation-in-part of application Ser. No. 592,284, Nov. 7, 1966. This application May 27, 1969, Ser. No. 828,347
The portion of the term of the patent subsequent to Oct. 7, 1986, has been disclaimed
Int. Cl. C08f 45/02, 45/54
U.S. Cl. 260—32.6                    9 Claims

ABSTRACT OF THE DISCLOSURE

A uniform pigment dispersion containing a pigment, an acrylic polymer, an acid characterized by having an ionization constant $k$ wherein the value of $-\log k$ is less than about 2.0, and an organic solvent. The pigment accounts for at least 4 percent by weight, the polymer at least 3 percent by weight, and the acid at least 0.10 times the weight of the pigment.

CROSS-REFERENCE TO RELATED APPLICATION

This is a continuation-in-part of application Ser. No. 592,284, filed Nov. 7, 1966, now U.S. Pat. No. 3,471,433, issued Oct. 7, 1969.

BACKGROUND OF THE INVENTION

(1) Field of the invention

This invention relates generally to pigment dispersions and more specifically to uniform and compatible pigment dispersions for use in the production of acrylonitrile containing linear polymers and fibers and shaped articles prepared therefrom.

(2) Description of the prior art

Heretofore, the use of pigments in coloring fibers and fibrous articles has been known and used for some time. There has been an increasing use of pigments for coloring fibers, especially with regard to "dope dyeing." Dope dyeing is the corporation of pigment into the spinning solutions prior to formation of fibers. When fibers are colored by this method, exceptional light and wash fastness are obtained, which is definitely an improvement over conventional dyeing. Also, pigmenting fibers is more economical than conventional dyeing due to the elimination of expensive drying operations.

It is a basic requirement in the pigmentation of acrylic fibers that the pigment particles be uniformly dispersed throughout the spinning solution. Any agglomeration of the pigment results in premature filter pluggage and in poor spinning performance characterized by filament breaks in the coagulation bath as the spinning solution is extruded through the spinnerette.

Good pigment dispersions in acrylic spin dopes may be obtained with pigments which have previously been combined with cellulose acetate. However, these combination or predispersed pigments are expensive, and since the cellulose acetate is not compatible with the acrylic spinning solution, it has a delustering effect on the fiber product and therefore, deep, pure translucent colors cannot be obtained. Furthermore, considerable leaching of the cellulose acetate occurs during wet spinning, and spinnability is generally inferior to noncellulose acetate containing fibers.

SUMMARY OF THE INVENTION

Accordingly, the difficulties of the prior art are overcome through the use of a dispersion containing a pigment, acrylic polymer, an acid characterized by having an ionization constant $k$ wherein the value of $-\log k$ is less than about 2.0, and an organic solvent.

It has been discovered that a uniform dispersion of the pigment particles having little tendency to reagglomerate is obtained by mechanically dispersing the pigment in a solvent for the acrylic polymer such as dimethyl formamide or dimethylacetamide to which has previously been added a small amount of a highly ionizable acid such as sulfuric, di- or trichloracetic, phosphorus, or pyrophosphoric acid. Suitable acids are those which are nonreactive with the solvent and have an ionization constant $k$ such that $-\log k$ is not substantially greater than 2, and generally being less than about 2.

The ionization constant $k$ of the above-enumerated acids are given as follows in Lange's Handbook of Chemistry, 8th Edition:

| Acid | $k$ | $-\log k$ |
|---|---|---|
| Dichloroacetic | $5 \times 10^{-2}$ | 1.30 |
| Phosphorus | $(k_1)\ 1.6 \times 10^{-2}$ | 1.80 |
| Pyrophosphoric | $(k_1)\ 1.4 \times 10^{-1}$ | 0.85 |
| Sulfuric | $(k_1)\ 4 \times 10^{-1}$ | 0.40 |
| Trichloroacetic | $1.3 \times 10^{-1}$ | 0.89 |

Heretofore, efforts to produce pigment dispersions from straight toners (non-predispersed pigments) without any type of pre-dispersing have dependent upon the incorporation of recognized dispersing aids and surfactants, and many compounds have been tried and tested with little success. The function of these dispersing aids was to prevent reagglomeration of the pigment particles once the particles had been separated by vigorous mechanical agitation. In general, the known surfactants have not been completely effective in maintaining the mechanically induced dispersions, and have been detrimental to spinning performance. In some instances, expensive equipment was required to preheat the dispersing agent and to maintain the pigment dispersion at an elevated temperature in order to prevent the dispersant from freezing out of solution.

Accordingly, it is an object of this invention to provide an improved pigment dispersion.

Also, an object of this invention is to provide a pigment dispersion for uniform coloration of linear polymers.

Further, it is an object of this invention to eliminate the incompatibility of the pigment dispersion and the polymer.

Another object of this invention is to reduce yarn cost and yarn contamination.

DESCRIPTION OF THE PREFERRED EMBODIMENTS

According to this invention, expensive high shear mechanical agitation and elaborate process equipment are not needed. As stated before, uniform and stable dispersions are obtained by dispersing the pigment in an organic solvent containing a small amount of a highly ionizable acid. The theory is that pigment particles absorb or associate themselves with a particular ion, thereby taking on the charge of the ion with the result being an electrical repulsive effect between pigment particles which prevents them from reagglomerating.

In order to prevent the dispersed pigment from physically settling out of the solvent, the viscosity of the mixture is increased by the addition of acrylic polymer. The polymer is most conveniently added by first dissolving the polymer in additional solvent, then adding this viscous solution to the pigment-solvent dispersion with sufficient agitation to assure uniform distribution. The final mixture of pigment, polymer, acid, and solvent is referred to as the pigment master batch or dispersion.

In the production of pigmented acrylic fibers, the master batch solution is injected into a standard unpigmented spinning solution at a rate controlled to provide the desired concentration of pigment in the final spinning solution. After thoroughly mixing the injected pigment solution with the spinning solution, the combination may be extruded and spun according to conventional techniques.

The relative proportions of the pigment, polymer, acid, and solvent in the master batch may be varied according to the particular requirements of the process involved. In the production of pigmented acrylic fibers, it is preferred to have at least 3 percent and generally between 5 and 20 perecnt acrylic polymer in the master batch to increase the viscosity of the mixture to a point where the dispersed pigment will have little tendency to settle. The master batch will generally contain at least 4 percent pigment, although higher concentrations in the range of 5 to 10% are preferred in order to reduce the rate at which the master batch must be injected into the unpigmented spinning solution to provide a given level of pigment in the final fiber product. With respect to the acid ingredient, we have found that good results are obtained using sulfuric acid and economical considerations favor its use over the other useful acid compounds. Benefits are realized by using a little as 1 part acid to 10 parts pigment, although visibly better results are obtained when the acid to pigment ratio is increased to 1 to 4.

Preferred organic pigments for incorporation into acrylic polymers in accordance with this invention include the insoluble azo group among which may be mentioned Pigment Blue WNL (C. I. 21180), Benzidine Toluidide Yellow (C. I. 21095); anthraquinone and vat pigments, for example Madder Lake (C. I. 58000), Thio Fast Red MU–6606 (C. I. 73310), Indathrone Yellow GK (C. I. 61725), Indanthrone Blue, Green Shade (C. I. 69810) and Thioindigo Red (C. I. 73310); Phthalocyanine pigments such as Phthalocyanine Green (C. I. 74260), Phthalocyanine Blue (C. I. 74160), and Zona Blue (C. I. 74160); and miscellaneous organic pigments not otherwise classified such as Acrylamino Yellow, which is described in U.S. Pat. No. 2,727,004. Soluble azo, basic and condensation acid pigments are suitable although not preferred since such pigments are soluble in some commonly used solvents. Applicable inorganic pigments include titanium dioxide, zinc oxide, aluminum oxide, magnesium oxide, iron oxides, lithopone, ultramarines, lead cromate, cadmium sulfide, cadmium selenide, barium sulfate, and carbon blacks.

EXAMPLE I

Five grams of 30 percent sulfuric acid were added to 105 grams of dimethyl acetamide and agitated to effectuate complete mixing. Then 15 grams of Columbian Carbon Company No. 999 Carbon Black Fluf (C.I. Pigment Black 7, C. I. 77266) were added, and the mixture agitated for 30 minutes. To stabilize this mixture, 110 grams of acrylic dope composed of 76.5 percent of a copolymer being 93 percent acrylonitrile and 7 percent vinyl acetate, 10.5 percent of a copolymer being 50 percent acrylonitrile and 50 percent methylvinyl pyridine, and 13 percent polyvinyl chloride, containing 18.7 percent solids were added and agitated for 20 minutes to form the pigment master batch containing 6.4% black pigment, 0.65% acid, and 10% polymer. Microscopic examination of the dispersion showed very little agglomeration of the pigment particles. In contrast, examination of a similar master batch prepared without sulfuric acid showed considerable agglomeration.

The pigment master batch prepared according to this invention was injected into and thoroughly mixed with an acrylic spin dope of the same composition as above, at a rate sufficient to provide 2.5% pigment in the combination. Spinnability of the pigmented dope was very good.

EXAMPLE II

Twenty grams of 30 percent sulfuric acid were added to 200 grams of dimethyl acetamide and agitated to effectuate complete mixing. Then 25 grams of Columbian Carbon Company No. 999 Carbon Black Fluf pigment (C. I. Pigment Black 7, C. I. 77266) were added and the mixture was agitated for 30 minutes. To stabilize this mixture, 350 grams of the acrylic dope described in Example 1 were added and the mixture agitated for 20 minutes to form a pigment masterbatch containing 4.2% pigment, 1.02% acid, and 11% polymer. Microscopic examination of the master batch showed the dispersion was not only superior to the non-acid containing dispersion, but also superior to the dispersion of Example 1 where a smaller amount of acid was used. It was thus determined that approximately one part sulfuric acid per 4 parts pigment is sufficient to disperse pigments in dimethyl acetamide.

The foregoing examples illustrate the essential features of the invention as well as some of the manners in which it may be practiced. Various changes and modifications may be made in practicing the invention without departing from the spirit and scope thereof, and therefore, the invention should not be limited except as defined in the appended claims.

We claim:

1. A pigment dispersion comprising in combination at least 4 percent pigment by weight, at least 3 percent acrylic polymer by weight, at least 0.10 times the weight of pigment of an acid characterized by having an ionization constant ($k$) wherein the value of $-\log k$ is less than about 2.0, and an organic solvent selected from the group consisting of dimethylacetamide and dimethylformamide.

2. A pigment dispersion according to claim 1 wherein the pigment is present in amounts ranging from about 5 to 10 percent by weight.

3. A pigment dispersion according to claim 1 wherein the polymer is present in amounts ranging from about 5 to 20 percent by weight.

4. A pigment dispersion according to claim 1 wherein the acid to pigment ratio is within the range of from about 1/10 to 1/4.

5. A pigment dispersion comprising in combination from about 5 to 10 percent of a pigment by weight, from about 5 to 20 percent of an acrylic polymer by weight, an acid characterized by having an ionization constant $k$ wherein the value of $-\log k$ is less about 2.0 and being present in an acid to pigment ratio within the range of from about 1/10 to 1/4, and an organic solvent selected from the group consisting of dimethylformamide and dimethylacetamide.

6. A pigment dispersion according to claim 5 wherein the acid is sulfuric acid.

7. The pigment dispersion according to claim 5 wherein the pigment is a toner pigmet.

8. A pigment dispersion according to claim 5 wherein the pigment is carbon black.

9. A pigment dispersion according to claim 6 wherein the pigment is carbon black.

References Cited
FOREIGN PATENTS 28,352    4/1964    Germany _____ 260—32.6N ALLAN LIEBERMAN, Primary Examiner U.S. Cl. X.R.

106—308; 260—30.6, 30.8, 31.2, 41